(12) United States Patent
Luo et al.

(10) Patent No.: US 12,335,912 B2
(45) Date of Patent: Jun. 17, 2025

(54) CALL RESPONSE METHOD, CALL RESPONSE DEVICE, TERMINAL DEVICE AND STORAGE MEDIUM

(71) Applicants: SHENZHEN XIAOMI COMMUNICATION TECHNOLOGY CO., LTD., Shenzhen (CN); BEIJING XIAOMI MOBILE SOFTWARE CO., LTD., Beijing (CN)

(72) Inventors: Zhi Luo, Shenzhen (CN); Cheng Wu, Shenzhen (CN); Nian Liu, Shenzhen (CN); Dexiang Jiang, Shenzhen (CN)

(73) Assignees: SHEHEN XIAOMI COMMUNICATION TECHNOLOGY CO., LTD., Shenzhen (CN); BEIJING XIAOMI MOBILE SOFTWARE CO., LTD., Beijing (CN)

( * ) Notice: Subject to any disclaimer, the term of this patent is extended or adjusted under 35 U.S.C. 154(b) by 364 days.

(21) Appl. No.: 17/896,041

(22) Filed: Aug. 25, 2022

(65) Prior Publication Data
US 2023/0362882 A1 Nov. 9, 2023

(30) Foreign Application Priority Data
May 5, 2022 (CN) .................. 202210479865.5

(51) Int. Cl.
*H04W 68/00* (2009.01)
*H04W 76/10* (2018.01)

(52) U.S. Cl.
CPC ......... *H04W 68/005* (2013.01); *H04W 76/10* (2018.02)

(58) Field of Classification Search
CPC ..... H04W 88/06; H04W 76/16; H04W 68/12; H04W 76/10; H04W 36/00224;
(Continued)

(56) References Cited

U.S. PATENT DOCUMENTS 7,983,242 B2 * 7/2011 Nasielski .............. H04W 68/00
379/215.01
8,046,470 B2 * 10/2011 Lewis ................. H04L 65/1069
709/227
(Continued)

FOREIGN PATENT DOCUMENTS

CN 101790140 A * 7/2010
GB 2419258 A * 4/2006 ............ H04W 68/00

OTHER PUBLICATIONS

Extended European Search Report of EP Application No. 22192642.1 dated Jun. 7, 2023, (9p).
(Continued)

*Primary Examiner* — Matthew C Sams
(74) *Attorney, Agent, or Firm* — Arch & Lake LLP

(57) ABSTRACT

Provided is a call response method in the field of terminal technology. The call response method includes receiving a first call indication message and a second call indication message sent by a network device, determining a target state of the terminal device, and responding to the first call indication message or the second call indication message according to the target state to perform the PS call or the CS call.

17 Claims, 9 Drawing Sheets

(58) Field of Classification Search
CPC ....... H04W 4/16; H04W 68/00; H04W 76/18;
H04W 80/04; H04W 12/06; H04W 12/45;
H04W 24/02; H04W 36/00226; H04W
36/142; H04W 36/1443; H04W 4/00;
H04W 4/06; H04W 4/14; H04W 4/60;
H04W 48/08; H04W 48/16; H04W 48/18;
H04W 60/00; H04W 60/005; H04W
60/02; H04W 68/005; H04W 72/23;
H04W 76/12; H04W 76/15; H04W 76/25;
H04W 76/27; H04W 76/28; H04W 8/06;
H04W 8/26; H04W 84/045; H04W 84/22;
H04W 88/08; H04W 88/10; H04W 88/16;
H04W 92/02; H04W 92/045; H04W
92/12; H04M 3/02; H04M 3/42042;
H04M 7/1205; H04M 2207/20; H04M
3/42

See application file for complete search history.

(56) References Cited

U.S. PATENT DOCUMENTS

| | | | |
|---|---|---|---|
| 8,254,356 B2* | 8/2012 | Asokan | H04W 76/15 455/450 |
| 9,876,903 B2* | 1/2018 | Yerrabommanahalli | H04W 76/16 |
| 2008/0102794 A1* | 5/2008 | Keevill | H04L 63/0471 455/411 |
| 2008/0273524 A1* | 11/2008 | Tenny | H04W 68/12 370/352 |
| 2009/0103455 A1* | 4/2009 | Balasubramanian | H04W 8/06 370/254 |
| 2011/0292871 A1* | 12/2011 | Chin | H04W 60/005 370/328 |
| 2012/0122459 A1* | 5/2012 | Wu | H04W 36/142 455/437 |
| 2013/0010656 A1* | 1/2013 | Chin | H04W 48/18 370/332 |
| 2014/0364118 A1* | 12/2014 | Belghoul | H04L 65/1104 455/435.1 |
| 2015/0092613 A1* | 4/2015 | Yerrabommanahalli | H04W 76/16 370/259 |
| 2017/0134994 A1* | 5/2017 | Chinthalapudi | H04L 65/1089 |
| 2023/0362882 A1* | 11/2023 | Luo | H04W 76/16 |

OTHER PUBLICATIONS

First Office Action of Chinese Application No. 202210479865.5 dated Jun. 13, 2022 with English translation, (8p).

* cited by examiner

CALL RESPONSE METHOD, CALL RESPONSE DEVICE, TERMINAL DEVICE AND STORAGE MEDIUM

CROSS-REFERENCE TO RELATED APPLICATION

This application is based upon and claims priority to Chinese Application No. 202210479865.5, filed on May 5, 2022, the entire disclosure of which is incorporated herein by reference for all purposes.

TECHNICAL FIELD

The present disclosure generally relates to the field of terminal technology, and more particularly to a call response method, a call response device, a terminal device and a storage medium.

BACKGROUND

At present, a user may use a terminal device to answer a call in the following two ways.

In one way, a call is performed in a network mode of a second-generation mobile communication technology (2G) or a third-generation mobile communication technology (3G), which is generally called as a circuit switching (CS) call, since a voice service of such a call uses a CS domain for calling.

In another way, an internet protocol multimedia subsystem (IP multimedia subsystem, IMS) call is performed in a network mode of a fourth-generation mobile communication technology (4G) or a fifth-generation mobile communication technology (5G), which is generally called as a packet switching (PS) call or a voice over long term evolution (VoLTE) call.

SUMMARY

The present disclosure seeks to solve at least one of the problems existing in the related art to at least some extent.

In order to achieve the above-mentioned object, the present disclosure provides technical solutions as follows.

According to a first aspect of the present disclosure, a call response method applied to a terminal device is provided. The call response method includes:
  receiving a first call indication message and a second call indication message sent by a network device, in which the first call indication message is received earlier than the second call indication message and is configured to indicate that one of a packet switching domain PS call and a circuit switching domain CS call is to be performed by the terminal device, and the second call indication message is configured to indicate that the other of the PS call and the CS call is to be performed by the terminal device;
  determining a target state of the terminal device;
  responding to the first call indication message or the second call indication message according to the target state to perform the PS call or the CS call.

According to a second aspect of the present disclosure, a terminal device is provided. The terminal device includes a processor, and a memory for storing instructions executable by the processor. The processor is configured to invoke and execute the executable instructions stored in the memory to perform the call response method according to the first aspect of embodiments of the present disclosure.

According to a third aspect of the present disclosure, a non-transitory computer-readable storage medium is provided. The non-transitory computer-readable storage medium has stored therein a computer program that, when executed by a processor, causes the processor to perform the call response method according to the first aspect of embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above-mentioned and/or other aspects and advantages of embodiments of the present disclosure will become apparent and more readily appreciated from the following descriptions made with reference to the drawings, in which.

DETAILED DESCRIPTION

Figure 1:
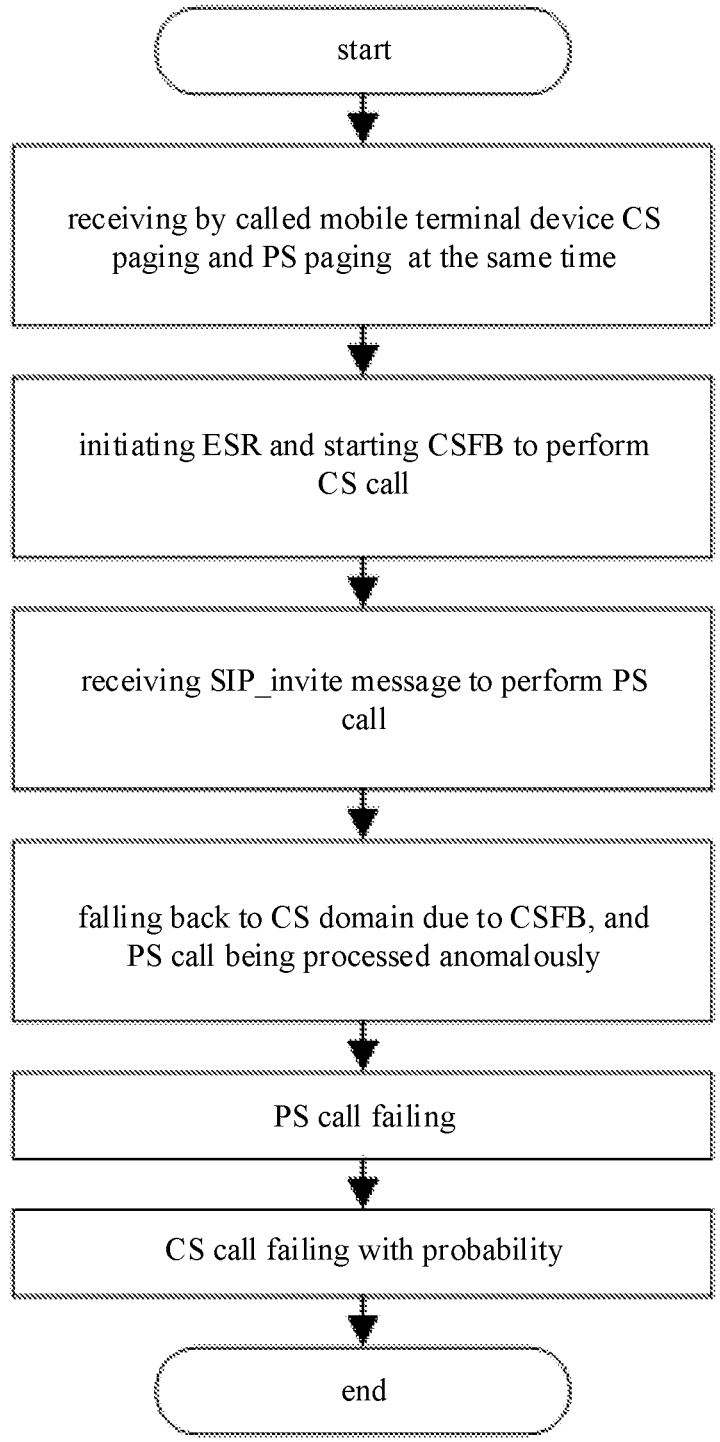
FIG. 1 is a schematic flow chart of a processing method upon receiving a CS call indication message and an IMS call indication message at the same time by a terminal device.

Embodiments of the present disclosure are described in detail below, examples of which are illustrated in the drawings. The same or similar elements or elements performing the same or similar functions are denoted by the same or similar reference numerals in different drawings unless indicated otherwise. The embodiments described herein with reference to drawings are explanatory, and used to generally understand the present disclosure. The embodiments shall not be construed to limit the present disclosure.

At present, a user may use a terminal device to answer a call in the following two ways.

In one way, a call is performed in a network mode of a second-generation mobile communication technology (2G) or a third-generation mobile communication technology (3G), which is generally called as a circuit switching (CS) call, since a voice service of such a call uses a CS domain for calling. Specifically, the CS call may be performed to establish a telephone conversation after the terminal device receives a CS call indication message sent by a network device. For example, when the terminal device is in an idle state, the CS call indication message may be a CS paging message, and when the terminal device is in a connected state, the CS call indication message may be a CS service notification message.

In another way, an internet protocol multimedia subsystem (IP multimedia subsystem, IMS) call is performed in a network mode of a fourth-generation mobile communication technology (4G) or a fifth-generation mobile communication technology (5G), which is generally called as a packet switching (PS) call or a voice over long term evolution (VoLTE) call. The PS call is a high-definition voice call established in a PS domain and an IMS domain. Specifically, the PS call may be performed to establish a telephone conversation after the terminal device receives an IMS call indication message sent by a network device. For example, when the terminal device is in an idle state, the IMS call indication message may be a PS paging message, and when the terminal device is in a connected state, the IMS call indication message may be a session initiation protocol invite (SIP_invite) message.

In general, if a terminal device is in an IMS network registration state, the terminal device will only receive an IMS call indication message sent by the network device and perform a PS call (i.e., an IMS call, or a VoLTE call). However, in a 4G/5G network mode, there may be an anomalous situation in the network, which may cause the network device to successively send a CS call indication message and an IMS call indication message to the terminal device that is used as a called party in a very short time, such that the terminal device that is used as the called party performs the CS call and the PS call at the same time. Due to a conflict between the CS call mode and the PS call mode, a call of the terminal device may fail, such that the user cannot receive an incoming call.

In an embodiment, as shown in FIG. 1, when a terminal device that is used as a called party simultaneously receives a CS paging message and a PS paging message sent by a network device, the terminal device initiates an extended service request (ESR) to the network device and performs a circuit switched domain fallback (CSFB) to perform a CS call first. However, at this time that the CS call is being performed, the terminal device receives a session initiation protocol invite SIP_invite message sent by the network device, such that the terminal device needs to perform a PS call at this time. However, when the terminal device performs the CS call, the terminal device has fallen back to a CS domain, such that the PS call cannot be performed normally, resulting in a failure of the PS call. Furthermore, the terminal device will take a certain amount of time to process the PS call, which may cause the ongoing CS call to fail.

In an application scenario, for example, the terminal device that is used as the called party may be in an idle state. When the terminal device is in the idle state, the CS call indication message is a CS paging message, and the IMS call indication message is a PS paging message. When the terminal device is in a 4G or 5G network mode, due to network anomaly, the terminal device will successively receive the CS paging message and the PS paging message sent by the network device within a very short time, such that the terminal device will perform the CS call and the PS call at the same time. However, there is a conflict between the two different types of calls, which may cause a call failure, resulting in missing an incoming call in the terminal device.

In another application scenario, for example, the terminal device that is used as the called party is in a connected state. When the terminal device is in a radio resource control (RRC) connection state, the CS call indication message is a CS service notification message, and the IMS call indication message is a SIP_invite message. When the terminal device is in a 4G/5G network mode and receives the SIP_invite message sent by the network device, the terminal device may perform the PS call. If the terminal device continues to receive the CS service notification message sent by the network device due to anomaly during the process of performing the PS call, the terminal device will perform the CS call. Since the terminal device performs the CS call and the PS call at the same time, a call conflict will occur, which causes a call failure.

In the scenarios in which the terminal device receives the CS call indication message and the IMS call indication message successively in a very short time due to network anomaly, the incoming call may be missed, which may affect the user experience to a certain extent.

In view of the above-mentioned problems, the present disclosure provides a call response method, a call response device, a terminal device and a storage medium.

The call response method, the call response device, the terminal device and the storage medium in some embodiments of the present disclosure will be described with reference to the accompanying drawings.

Figure 2:
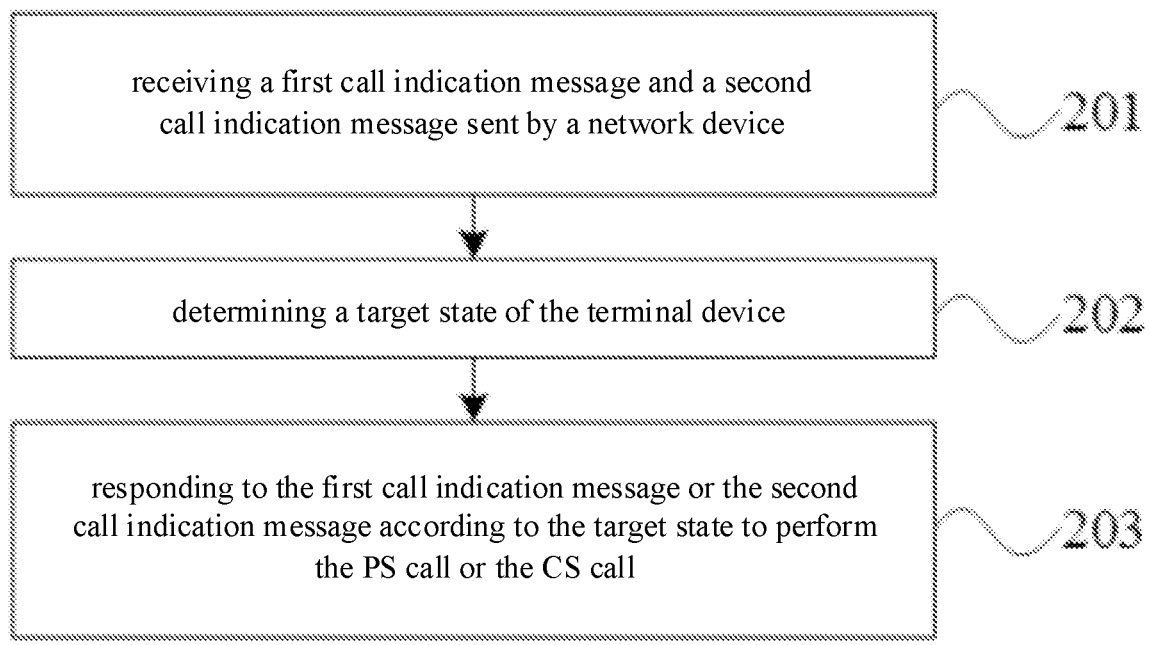
FIG. 2 is a schematic flow chart of a call response method in an embodiment of the present disclosure.

FIG. 2 is a flow chart of a call response method in an embodiment of the present disclosure.

The call response method in embodiments of the present disclosure may be applied to a terminal device, such that the terminal device may perform a call response function.

The terminal device is an entity for receiving or transmitting a signal, such as a mobile phone on a user side. The terminal device may also be referred to as a terminal, user equipment (UE), a mobile station (MS), a mobile terminal (MT), or the like. The terminal device may be a device with a communication function, such as a car, a smart car, a mobile phone, a wearable device, a tablet computer (a Pad), a TV, a TV stick, a computer with a wireless transceiving function, a virtual reality (VR) terminal device, an augmented reality (AR) terminal device, a wireless terminal device under industrial control, a wireless terminal device in self-driving, a wireless terminal device in remote medical surgery, a wireless terminal device in a smart grid, a wireless terminal device in transportation safety, a wireless terminal device in a smart city, a wireless terminal device in a smart home or the like. The specific technology and specific device form adopted by the terminal device are not limited in the embodiments of the present disclosure.

As shown in FIG. 2, the call response method may include steps 201 to 203 as follows.

In step 201, a first call indication message and a second call indication message sent by a network device are received.

The first call indication message is received earlier than the second call indication message, and is configured to indicate that one of a packet switching domain PS call and a circuit switching domain CS call is to be performed by the terminal device. The second call indication message is configured to indicate that the other of the PS call and the CS call is to be performed by the terminal device.

In some embodiments, the network device is an entity on a network side for transmitting or receiving a signal. For example, the network device may be an evolved NodeB (eNB), a transmission reception point (or a transmit receive point, TRP), a next generation NodeB (gNB) in a NR system, base stations in other future mobile communication systems, an access node in a wireless fidelity (WiFi) system, or the like. The specific technology and specific device form adopted by the network device are not limited in the embodiments of the present disclosure. The network device in embodiments of the present disclosure may be composed of a central unit (CU) and a distributed unit (DU). The CU may also be referred to as a control unit. By using a structure of the CU-DU, protocol layers of the network device, such as a base station, may be separated, such that functions of some of the protocol layers are centrally controlled by the CU, and functions of a part or all of the other of the protocol layers are distributed in the DU, and then the DU is centrally controlled by the CU.

In some embodiments of the present disclosure, the first call indication message may be an IMS call indication message (or referred to as a PS call indication message, or a VoLTE call indication message). Correspondingly, the first call indication message may be configured to indicate that the PS call (or referred to as an IMS call, or a VoLTE call) is to be performed by the terminal device. Alternatively, the first call indication message may be a CS call indication message. Correspondingly, the first call indication message may be configured to indicate that the CS call is to be performed by the terminal device.

In some embodiments of the present disclosure, the second call indication message may be an IMS call indication message. Correspondingly, the second call indication message may be configured to indicate that the PS call is to be performed by the terminal device. Alternatively, the second call indication message may be a CS call indication message. Correspondingly, the second call indication message may be configured to indicate that the CS call is to be performed by the terminal device.

It should be noted that the first call indication message is different from the second call indication message, and the first call indication message may be received earlier than the second call indication message.

In some embodiments, when the first call indication message is configured to indicate that the PS call is to be performed by the terminal device, the second call indication message is configured to indicate that the CS call is to be performed by the terminal device.

In other embodiments, when the first call indication message is configured to indicate that the CS call is to be performed by the terminal device, the second call indication message is configured to indicate that the PS call is to be performed by the terminal device.

In some embodiments of the present disclosure, the terminal device may receive the first call indication message and the second call indication message sent by the network device.

In step 202, a target state of the terminal device is determined.

In some embodiments of the present disclosure, the target state may be an idle state or a connected state. When the target state is the idle state, the terminal device may only receive downlink information sent by the network device, but cannot send uplink information to the network device. When the target state is the connected state, the terminal device may not only receive downlink information sent by the network device, but also send uplink information to the network device. For example, when the target state is the connected state, a communication connection, such as a radio resource control (RRC) connection, is established between the terminal device and the network device, and the terminal device may send the uplink information to the network device through the above-mentioned communication connection.

In some embodiments of the present disclosure, the target state of the terminal device may be determined. That is, it is determined whether the target state of the terminal device is the idle state or the connected state.

In step 203, the first call indication message or the second call indication message are responded to according to the target state to perform the PS call or the CS call.

In some embodiments of the present disclosure, the terminal device may respond to the first call indication message or the second call indication message according to the target state of the terminal device to perform the PS call or the CS call.

In some embodiments, the terminal device may respond to the first call indication message according to the target state of the terminal device to perform the call indicated by the first call indication message. For example, when the first call indication message is the IMS call indication message, the terminal device may perform the PS call. Alternatively, when the first call indication message is the CS call indication message, the terminal device may perform the CS call.

In other embodiments, the terminal device may respond to the second call indication message according to the target state of the terminal device to perform the call indicated by the second call indication message. For example, when the second call indication message is the IMS call indication message, the terminal device may perform the PS call. Alternatively, when the second call indication message is the CS call indication message, the terminal device may perform the CS call.

In some embodiments of the present disclosure, the terminal device may determine whether the second call indication message is received within a preset duration after the first call indication message is received. If the terminal device receives the second call indication message within the preset duration after the first call indication message is received, the above-mentioned steps 201 to 203 are executed. If the terminal device does not receive the second call indication message within the preset time duration after the first call indication message is received, the terminal device may only respond to the first call indication message.

The preset duration may be preset in advance, and may be a shorter duration, such as 2 seconds, 3 seconds, 5 seconds, 7 seconds and so on.

In the call response method in some embodiments of the present disclosure, the first call indication message and the second call indication message sent by the network device are received. The first call indication message is received earlier than the second call indication message, and is configured to indicate that one of a packet switching domain PS call and a circuit switching domain CS call is to be performed by the terminal device. The second call indication message is configured to indicate that the other of the PS call and the CS call is to be performed by the terminal device. The target state of the terminal device is determined. The first call indication message or the second call indication message is responded to according to the target state to perform the PS call or the CS call. In this way, one of the first call indication message and the second call indication message successively sent by the network device is responded to according to the target state of the terminal device, such that the terminal device only performs one type of call at each moment, that is, only performs the PS call or only performs the CS call, which may avoid a call failure in a related art caused by performing the PS call and the CS call by the terminal device at the same time when the network device sends two different types of call indication messages at the same time due to a network anomaly, thus avoiding a situation that the user misses an incoming call. Thus, it is possible to effectively improve the user experience.

In some embodiments of the present disclosure, when the target state of the terminal device is the idle state, the present disclosure further provides a call response method to clearly illustrate how to respond to the first call indication message or the second call indication message according to the target state.

Figure 3:
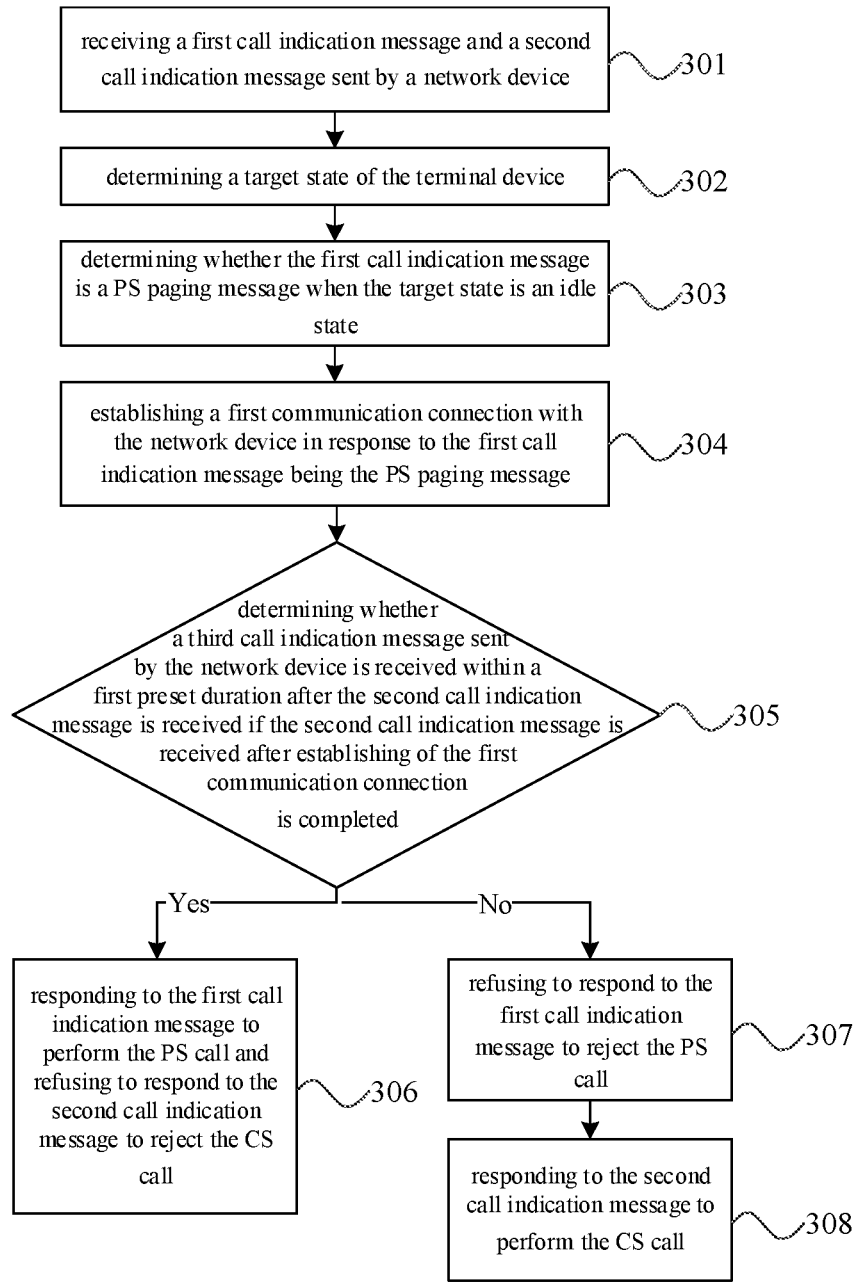
FIG. 3 is a schematic flow chart of a call response method in another embodiment of the present disclosure.

FIG. 3 is a flow chart of a call response method in another embodiment of the present disclosure.

As shown in FIG. 3, the call response method may include the steps 301 to 308 as follows.

In step 301, a first call indication message and a second call indication message sent by a network device are received.

In step 302, a target state of the terminal device is determined.

For execution processes of steps 301 to 302, reference may be made to the execution processes of similar steps in any of the above-mentioned embodiments of the present disclosure, which will not be repeated here.

In step 303, it is determined whether the first call indication message is a PS paging message when the target state is an idle state.

The PS paging message is configured to indicate that the PS call is to be performed by the terminal device.

In some embodiments of the present disclosure, when the target state of the terminal device is the idle state, it may be determined whether the first call indication message first received by the terminal device is the PS paging message.

In step 304, a first communication connection is established with the network device in response to the first call indication message being the PS paging message.

In some embodiments of the present disclosure, when the first call indication message is the PS paging message, the terminal device may establish the first communication connection, such as an RRC connection, with the network device to communicate with the network device based on the first communication connection.

In step 305, it is determined whether a third call indication message sent by the network device is received within a first preset duration after the second call indication message is received if the second call indication message is received after establishing of the first communication connection is completed.

In some embodiments of the present disclosure, if the terminal device receives the third call indication message sent by the network device within the first preset duration after the second call indication message is received, step 306 is executed. If the terminal device does not receive the third call indication message sent by the network device within the first preset duration after the second call indication message is received, steps 307 to 308 are executed.

The third call indication message is configured to indicate that the PS call is to be performed by the terminal device based on the first communication connection.

In some embodiments of the present disclosure, the first preset duration may be preset in advance. For example, the first preset duration may be 2 seconds, 3 seconds and so on.

It should be noted that the first preset duration may be a shorter duration, which may be set according to manual experience, or may be dynamically adjusted according to actual application scenarios and application requirements.

In some embodiments of the present disclosure, when the first call indication message is the PS paging message, the first call indication message is configured to indicate that the PS call is to be performed by the terminal device. Correspondingly, the second call indication message may be the CS call indication message, and is configured to indicate that the CS call is to be performed by the terminal device.

In some embodiments of the present disclosure, the third call indication message may be a call indication message received by the terminal device after establishing of the first communication connection is completed. That is, the third call indication message is a call indication message received when the terminal device is in the connected state. The third call indication message is configured to indicate that the PS call is to be performed by the terminal device based on the first communication connection. That is, the third call indication message may be the SIP_invite message.

In some embodiments of the present disclosure, when the second call indication message is received after establishing of the first communication connection is completed, it may be determined whether the third call indication message sent by the network device is received within the first preset duration after the second call indication message is received. If the third call indication message sent by the network device is received within the first preset duration after the second call indication message is received, step 306 is executed. If the third call indication message sent by the network device is not received within the first preset duration after the second call indication message is received, steps 307 to 308 are executed.

In some embodiments of the present disclosure, it is clearly illustrated how to determine whether the third call indication message sent by the network device is received within the first preset duration after the second call message is received. Specifically, the terminal device may start a first timer in response to receiving the second call indication message. In a running period of the first timer, it is determined whether the third call indication message sent by the network device is received. When a value of the first timer is equal to the first preset duration, the first timer stops running.

That is, when the terminal device receives the second call indication message sent by the network device, the first timer may be started. A running duration of the first timer is the first preset duration. When a value of the first timer is less than the first preset duration, the first timer is in a running phase, and when the value of the first timer is equal to the first preset duration, the first timer stops running. During the running duration of the first timer, it may be determined whether the terminal device has received the third call indication message sent by the network device. If the third call indication message sent by the network device is received during the running duration of the first timer, step 306 is executed. If the third call indication message sent by the network device is not received during the running duration of the first timer, steps 307 to 308 are executed.

It could be understood that, in practical application, in case that the second call indication message sent by the network device is not received after establishing of the first communication connection is completed, since the terminal device only receives one type of call indication message, there will be no conflict between the PS call and the CS call at the same time. In some embodiments of the present disclosure, if the second call indication message is not received after establishing of the first communication connection is completed, the first call indication message may be responded to, such that the PS call is performed.

In step 306, the first call indication message is responded to, so as to perform the PS call, and the second call indication message is refused to respond to, so as to reject the CS call.

In some embodiments of the present disclosure, when the terminal device receives the third call indication message within the first preset duration after the second call indication message is received, the first call indication message may be responded to, so as to perform the PS call, and the second call indication message may be refused to respond to, so as to reject the CS call. That is, by refusing to send an extended service request (ESR) to the network device, the circuit switched domain fallback (CSFB) is refused to perform, thus avoiding a call conflict caused by performing the PS call and the CS call by the terminal device at the same time.

In step 307, the first call indication message is refused to respond to, so as to reject the PS call.

In some embodiments of the present disclosure, when the terminal device does not receive the third call indication message within the first preset duration after the second call indication message is received, the first call indication message may be refused to respond to, so as to reject to perform the PS call.

In step 308, the second call indication message is responded to, so as to perform the CS call.

In some embodiments of the present disclosure, the terminal device may respond to the second call indication message to perform the CS call. That is, the terminal device sends the ESR to the network device and performs the CSFB to perform the CS call.

It should be noted that step 306 and steps 307 to 308 are two parallel implementations, and one of them may be selected for execution in the practical application.

In the call response method in some embodiments in the present disclosure, it is determined whether the first call indication message is the PS paging message when the target state is the idle state. The first communication connection is established with the network device in response to the first call indication message being the PS paging message. If the second call indication message is received after establishing of the first communication connection is completed, it is determined whether the third call indication message sent by the network device is received within the first preset duration after the second call indication message is received. The third call indication message is configured to indicate that the PS call is to be performed by the terminal device based on the first communication connection. In response to receiving the third call indication message within the first preset duration, the first call indication message is responded to, so as to perform the PS call, and the second call indication message is refused to respond to, so as to reject the CS call. In response to receiving no third call indication message within the first preset duration, the first call indication message is refused to respond to, so as to reject the PS call, and the second call indication message is responded to, so as to perform the CS call. In this way, the terminal device only performs one type of call at a moment. That is, the terminal device only performs the PS call or only performs the CS call at a moment, which may avoid a call failure caused by performing two different types of calls at the same time, and thus improve use experience.

In the above-mentioned embodiments, the call response process of the terminal device is described when the terminal device is in the idle state and the first call indication message first received by the terminal device is the PS paging message. In the practical application, the first call indication message first received by the terminal device may also be the CS paging message when the target state of the terminal device is the idle state. The present disclosure further provides a call response method to clearly illustrate how the terminal device performs the call when the first call indication message is the CS paging message.

Figure 4:
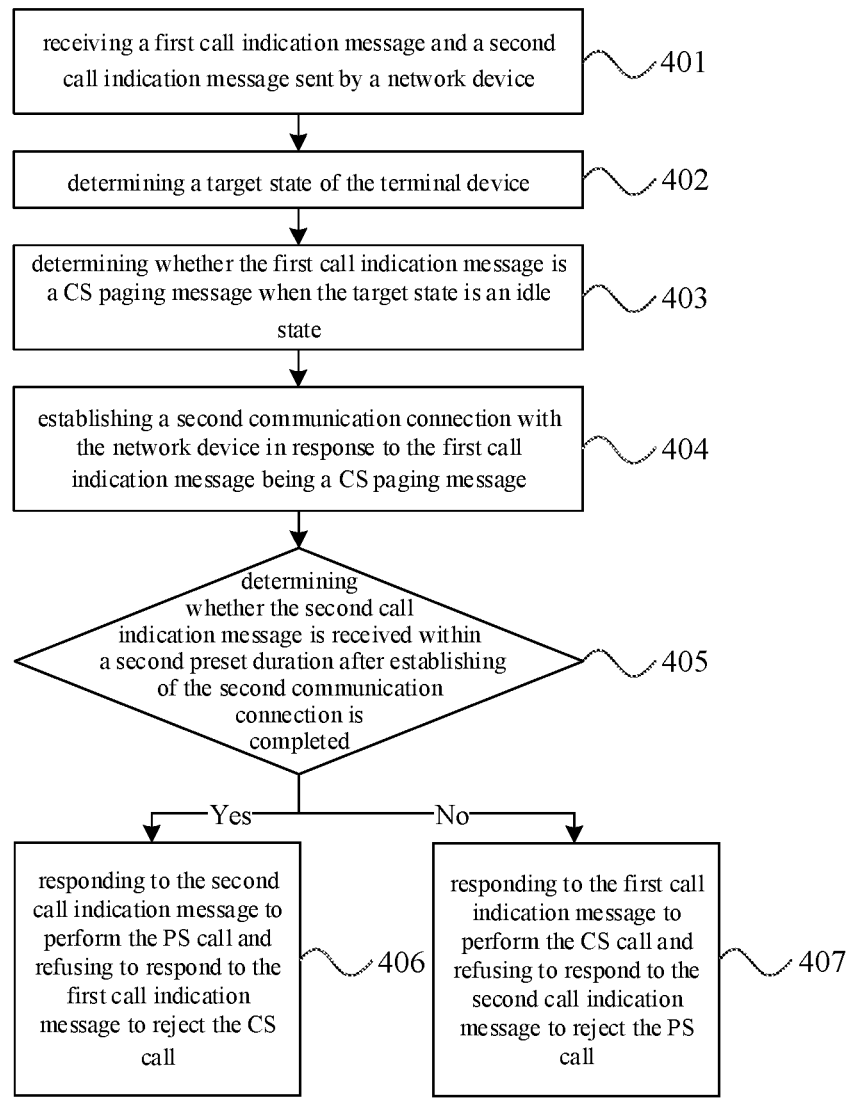
FIG. 4 is a schematic flow chart of a call response method in another embodiment of the present disclosure.

FIG. 4 is a flow chart of a call response method in another embodiment of the present disclosure.

As shown in FIG. 4, the call response method may include the steps 401 to 407 as follows.

In step 401, a first call indication message and a second call indication message sent by a network device are received.

In step 402, a target state of the terminal device is determined.

For execution processes of steps 401 to 402, reference may be made to the execution processes of similar steps in any of the above-mentioned embodiments of the present disclosure, which will not be repeated here.

In step 403, it is determined whether the first call indication message is a CS paging message when the target state is an idle state.

The CS paging message is configured to indicate that the CS call is to be performed by the terminal device.

In some embodiments of the present disclosure, when the target state of the terminal device is the idle state, it may be determined whether the first call indication message first received by the terminal device is the CS paging message. If the first call indication information first received by the terminal device is the CS paging message, step 404 and its subsequent steps are executed. If the first call indication information first received by the terminal device is not the CS paging message, that is, the first call indication message is the PS paging message, step 304 and its subsequent steps may be executed.

In step 404, a second communication connection is established with the network device in response to the first call indication message being the CS paging message.

In some embodiments of the present disclosure, when the first call indication message is the CS paging message, that is, when the first call indication message first received by the terminal device is the CS paging message, the terminal device may establish the second communication connection, such as an RRC connection, with the network device to communicate with the network device based on the second communication connection.

In step 405, it is determined whether the second call indication message is received within a second preset duration after establishing of the second communication connection is completed.

In some embodiments of the present disclosure, if the second call indication message is received within the second preset duration after establishing of the second communication connection is completed, step 406 is executed. If the second call indication message is not received within the second preset duration after establishing of the second communication connection is completed, step 407 is executed.

In some embodiments of the present disclosure, when the first call indication message is the CS paging message. Correspondingly, the second call indication message may be an IMS call indication message. For example, when the second call indication message is received by the terminal device within the second preset duration after establishing of the second communication connection is completed, the second call indication message may be a SIP_invite message In some embodiments of the present disclosure, the second preset duration may be preset. For example, the second preset duration may be 1 second, 2 seconds and so on.

It should be noted that the second preset duration may be the same as the first preset duration, or may also be different from the first preset duration.

It should be noted that the second preset duration may be a shorter duration, which may be set according to manual experience, or may be dynamically adjusted according to actual application scenarios and application requirements.

In some embodiments of the present disclosure, the terminal device may determine whether the second call indication message is received within the second preset duration after establishing of the second communication connection is completed. If the second call indication message is received within the second preset duration after establishing of the second communication connection is completed, step 406 is executed. If the second call indication message is not received within the second preset duration after establishing of the second communication connection is completed, step 407 is executed.

In some embodiments of the present disclosure, the terminal device may start a second timer in response to establishing of the second communication connection being completed. That is, when establishing of the second communication connection is completed, the second timer is started. When a value of the second timer is equal to the second preset duration, that is, when a running duration of the second timer is the second preset duration, the second timer stops running. The terminal device may determine whether the second call indication message is received during the running period of the second timer. If the second call indication message is received during the running period of the second timer, step 406 is executed. If the second call indication message is not received during the running period of the second timer, step 407 is executed.

In step 406, the second call indication message is responded to, so as to perform the PS call, and the first call indication message is refused to respond to, so as to reject the CS call.

In some embodiments of the present disclosure, if the second call indication message is received within the second preset duration after establishing of the second communication connection is completed, that is, if the second call indication message is received during the running period of the second timer, the second call indication message is responded to, so as to perform the PS call, and the first call indication message is refused to respond to, so as to refuse to perform the CS call. That is, the terminal device may refuse to send an ESR to the network device, thus avoiding a call conflict caused by performing the PS call and the CS call by the terminal device at the same time.

In step 407, the first call indication message is responded to, so as to perform the CS call, and the second call indication message is refused to respond to, so as to reject the PS call.

In some embodiments of the present disclosure, if the second call indication message is not received within the second preset duration after establishing of the second communication connection is completed, that is, if the second call indication message is received outside the second preset duration after establishing of the second communication connection is completed, the first call indication message may be responded to, so as to perform the CS call, and the second call indication message may be refused to respond to, so as to refuse to perform the PS call.

In some embodiments, if the second call indication message is received after the second timer stops running, the second call indication message may be refused to respond to, so as to reject the PS call. That is, if the terminal device does not receive the second call indication message within the running period of the second timer, the first call indication message may be responded to, so as to perform the CS call.

It should be noted that step 406 and step 407 are two parallel implementations, and one of them may be selected for execution in the practical application.

Figure 5:
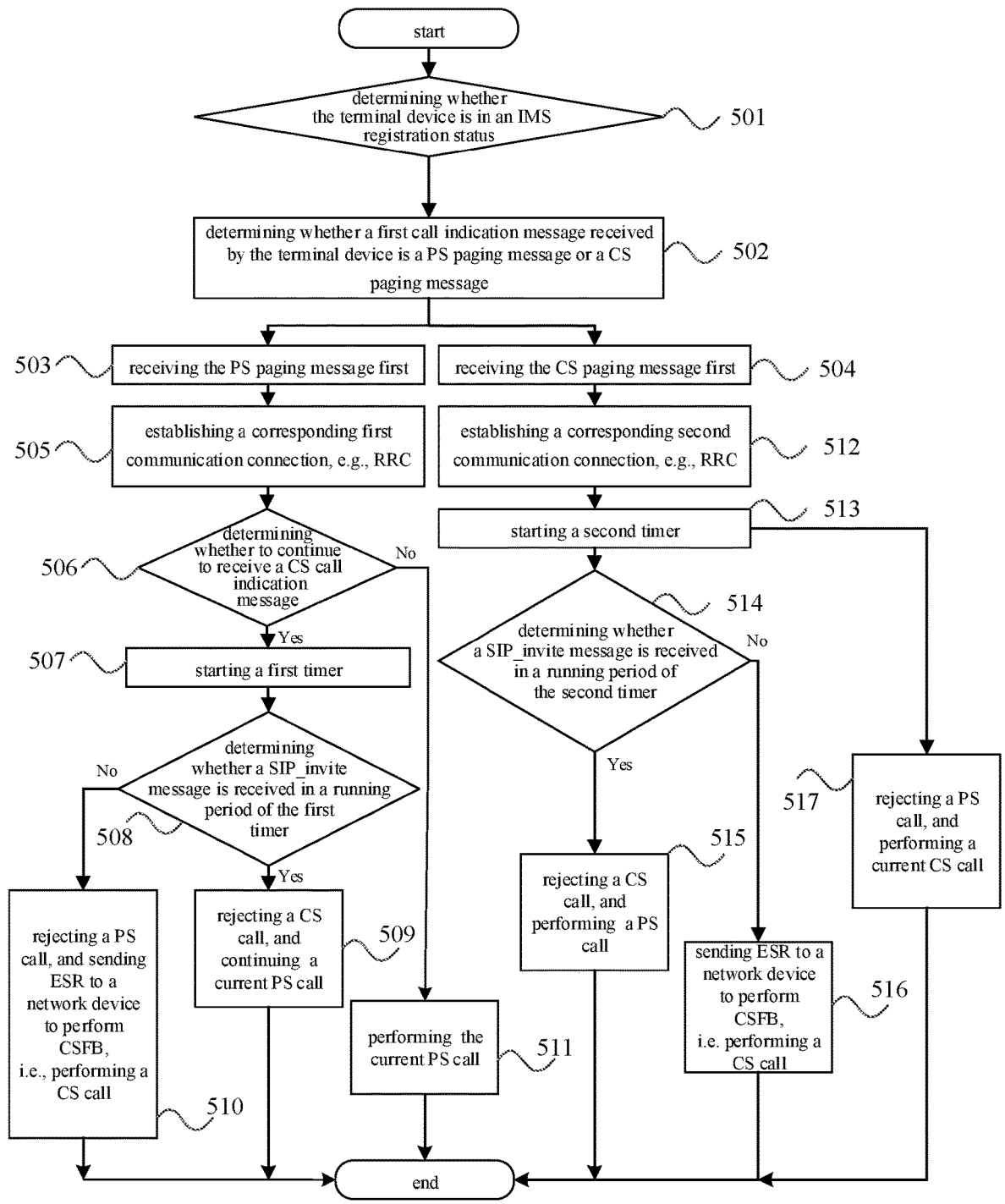
FIG. 5 is a schematic flow chart of a call response when a terminal device is in an idle state in an embodiment of the present disclosure.

In an application scenario, when a terminal device is in an idle state, a call response process of the terminal device may be as shown in FIG. 5, and may specifically include the following steps 501 to 517.

In step 501, when the terminal device is in the idle state, it may be detected whether the terminal device is in an IMS registration state to determine whether a network mode of the terminal device is a 4G/5G mode. If the terminal device is in the IMS registration state, the subsequent steps may be executed. If the terminal device is not in the IS registration state, the subsequent steps cannot be executed.

In step 502, when the terminal device is in the IMS registration state, it may be determined whether a first call indication message first received by the terminal device is a PS paging message (i.e., an IS call indication message) or a CS paging message (i.e., a CS call indication message).

In step 503, if the first call indication message is the PS paging message, steps 505 to 511 are executed.

In step 504, if the first call indication message is the CS paging message, steps 512 to 515 are executed.

In step 505, in case that the first call indication message is the PS paging message, a first communication connection between the terminal device and a network device is established. For example, the first communication connection may be an RRC connection. The terminal device may send a request for establishing the RRC connection to the network device. After the request for establishing the RRC connection is received by the network device, the network device may send a confirmation response to the terminal device in response to receiving the request. After the terminal device receives the confirmation response, the RRC connection may be established.

In step 506, after establishing of the first communication connection is completed, it may be determined whether to continue to receive the second call indication message, that is, a CS call indication message sent by the network device. If the second call indication message is received, step 507 is executed, and if the second call indication message is not received, step 511 is executed.

In step 507, if the terminal device receives the second call indication message (i.e., the CS call indication message, specifically a CS service notification message) sent by the network device after establishing of the first communication connection is completed, a first timer started. A running duration of the first timer is a first preset duration, such as 2 s. When a value of the first timer is equal to the first preset duration, the first timer stops running.

In step 508, during the running period of the first timer, it is determined whether the terminal device receives a third call indication message sent by the network device subsequently. The third call indication message is configured to indicate that a PS call is to be performed by the terminal device. The third call indication message is a SIP_invite message.

In step 509, if the terminal device receives the SIP_invite message during the running period of the first timer, a CS call is refused to perform. That is, the terminal device refuses to send an ESR to the network device, and may continue performing the current PS call.

In step 510, if the terminal device does not receive the SIP_invite message during the running period of the first timer, the current PS call is rejected, and the terminal device may send the ESR to the network device and perform a CSFB to perform the CS call.

In step 511, if the terminal device does not receive the second call indication message (i.e., the CS call indication message) sent by the network device after establishing of the first communication connection is completed, the current PS call is performed.

In step 512, in case that the first call indication message first received by the terminal device is the CS paging message, a second communication connection, such as an RRC connection, between the terminal device and the network device may be established.

In step 513, after establishing of the second communication connection is completed, a second timer may be started. A running duration of the second timer is the second preset duration, such as 2 s. When a value of the second timer is equal to the second preset duration, the second timer stops running.

In step 514, during the running period of the second timer, it may be determined whether the terminal device continues to receive the second call indication message (that is, the IMS call indication message, i.e., the SIP_invite message) sent by the network device. If the terminal device receives the second call indication message during the running period of the second timer, step 515 is executed. If the terminal device does not receive the second call indication message during the running period of the second timer, steps 516 to 517 are executed.

In step 515, if the terminal device receives the SIP_invite message sent by the network device during the running period of the second timer, the CS call is rejected and the PS call is performed.

In step 516, if the terminal device does not receive the SIP_invite message sent by the network device during the running period of the second timer, the terminal device may send the ESR to the network device and perform the CSFB to perform the CS call.

In step 517, if the second call indication message (i.e., the IMS call indication message) sent by the network device is received after the second timer stops running, the PS call is directly rejected to perform, and the current CS call is performed.

It should be noted that when the terminal device is in the idle state, the IMS call indication message may be the PS paging message. When the terminal device is in the connected state, the IMS call indication message may be the SIP_invite message. When the terminal device is in the idle state, the CS call indication message may be the CS paging message. When the terminal device is in the connected state, the CS call indication message may be the CS service notification message.

In this way, when the terminal device is in the 4G/5G network mode and is in the idle state, if the terminal device is used as a called party, by the above-mentioned method, it is possible to effectively avoid a call failure caused by performing the CS call and the PS call at the same time in case that the terminal device receives the CS call indication message and the IMS call indication message successively sent by the network device in a very short time due to network anomaly.

In the call response method in the embodiments of the present disclosure, it is determined whether the first call indication message is the CS paging message when the target state is an idle state. The second communication connection is established with the network device in response to the first call indication message being the CS paging message. It is determined whether the second call indication message is received within the second preset duration after establishing of the second communication connection is completed. If the second call indication message is received within the second preset duration, the second call indication message is responded to, so as to perform the PS call, and the first call indication message is refused to respond to, so as to reject the CS call. If the second call indication message is not received within the second preset duration, the first call indication message is responded to, so as to perform the CS call. In this way, the terminal device only performs one type of call at a moment, that is, the terminal device only performs the PS call or only performs the CS call at a moment, which may avoid a call failure caused by performing two different types of calls at the same time, and thus improve use experience.

In some embodiments of the present disclosure, when the target state of the terminal device is the connected state, the present disclosure further provides a call response method to clearly illustrate how to respond to the first call indication message or the second call indication message according to the target state.

Figure 6:
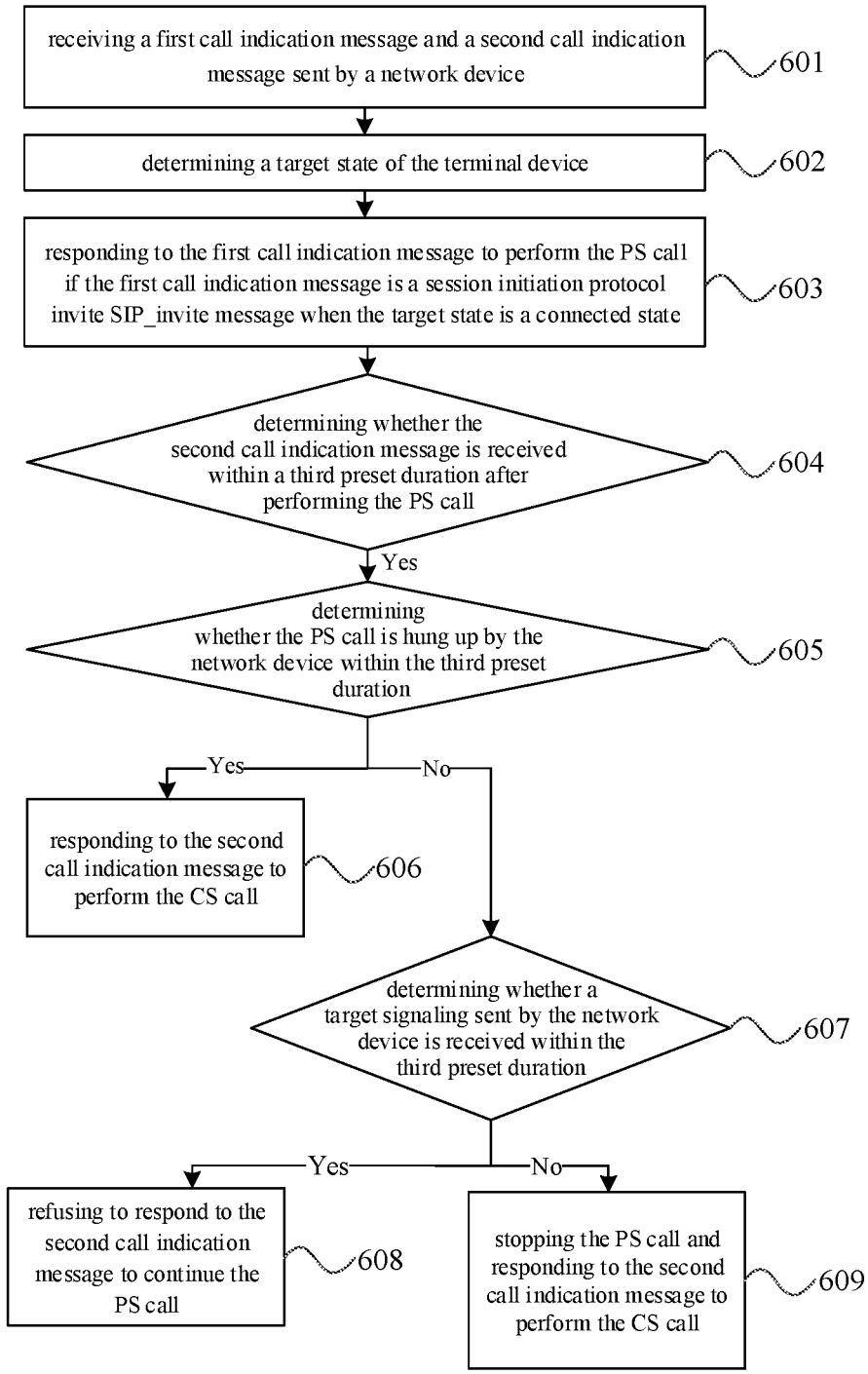
FIG. 6 is a schematic flow chart of a call response method in another embodiment of the present disclosure.

FIG. 6 is a flow chart of a call response method in another embodiment of the present disclosure.

As shown in FIG. 6, the call response method may include steps 601 to 609 as follows.

In step 601, a first call indication message and a second call indication message sent by a network device are received.

In step 602, a target state of the terminal device is determined.

For execution processes of steps 601 to 602, reference may be made to the execution processes of similar steps in any of the above-mentioned embodiments of the present disclosure, which will not be repeated here.

In step 603, when the target state is a connected state, if the first call indication message is a SIP_invite message, the first call indication message is responded to, so as to perform the PS call.

The SIP_invite message is configured to indicate that the PS call is to be performed by the terminal device.

In some embodiments of the present disclosure, when the target state is the connected state, if the first call indication message first received by the terminal device is the SIP_invite message, the first call indication message may be responded to, such that the PS call is performed.

In step 604, it is determined whether the second call indication message is received within a third preset duration after performing the PS call.

In some embodiments of the present disclosure, when the first call indication message is the SIP_invite message (that is, an IMS call indication message), the second call indication message may be a CS service notification message (that is, a CS call indication message) accordingly. The second call indication message is configured to indicate that the CS call is to be performed by the terminal device.

In some embodiments of the present disclosure, the third preset duration may be preset in advance. For example, the third preset duration may be 5 s, 7 s and so on.

It should be noted that the third preset duration may be set according to human experience, or may be dynamically adjusted according to actual application scenarios and application requirements.

In some embodiments of the present disclosure, the terminal device may determine whether the second call indication message is received within the third preset duration after performing the PS call.

In some embodiments of the present disclosure, the terminal device may start a third timer in response to performing the PS call. That is, when the terminal device performs the PS call, the third timer may be started. A running duration of the third timer is the third preset duration. When a value of the third timer is less than the third preset duration, the third timer is in a running phase, and when the value of the third timer is equal to the third timing duration, the third timer stops running. The terminal device may determine whether the second call indication message is received within the running period of the third timer.

In step 605, it is determined whether the PS call is hung up by the network device within the third preset duration if the second call indication message is received within the third preset duration.

In some embodiments of the present disclosure, if the PS call is hung up by the network device within the third preset duration after the terminal device performs the PS call, step 606 is executed. If the PS call is not hung up by the network device within the third preset duration after the terminal device performs the PS call, step 607 is executed.

In some embodiments of the present disclosure, if the second call indication message is received within the third preset duration after performing the PS call, that is, if the second call indication message is received within the running period of the third timer, it may be determined whether the PS call is hung up by the network device within the third preset duration after performing the PS call.

In some embodiments of the present disclosure, in order to clearly illustrate how the terminal device determines whether the PS call is hung up by the network device within the third preset duration, the call response method may further include acquiring network information of the network device within the third preset duration after performing the PS call; determining whether the network device is anomalous according to the network information; determining that the PS call is hung up by the network device in case that the network device is anomalous; determining that the PS call is not hung up by the network device in case that the network device is not anomalous.

Specifically, within the third preset duration after the terminal device performs the PS call, that is, in the running period of the third timer, the terminal device may acquire the network information of the network device. For example, the network device may send an indication signaling with the network information to the terminal device, and the indication signaling is configured to indicate whether the network device is anomalous. Correspondingly, after the above-mentioned indication signaling is received by the terminal device, the terminal device may determine whether the network device is anomalous according to the network information in the indication signaling. In case that the network device is anomalous, it may be determined that the PS call is hung up by the network device, and step 606 may be executed. In case that the network device is not anomalous, it may be determined that the PS call is not hung up by the network device, and step 607 may be executed.

In step 606, the second call indication message is responded to, so as to perform the CS call.

In some embodiments of the present disclosure, if the PS call is hung up by the network device within the third preset duration after the terminal device performs the PS call, the second call indication message (that is, the CS call indication message) may be responded to, such that the CS call is performed. That is, the terminal device may send an ESR to the network device to perform a CSFB.

In step 607, it is determined whether a target signaling sent by the network device is received within the third preset duration. If the target signaling sent by the network device is received within the third preset duration, step 608 is executed. If the target signaling sent by the network device is not received within the third preset duration, step 609 is executed.

The target signaling is configured to indicate that the PS call is performed to a ringing stage.

In some embodiments of the present disclosure, the ringing stage may be a 180 ringing stage.

In some embodiments of the present disclosure, the network device may indicate a stage that the PS call is performed to by sending a signaling to the terminal device. For example, when the PS call is performed to the ringing stage, the network device may send to the terminal device the target signaling which is configured to indicate that the PS call is performed to the ringing stage.

In some embodiments of the present disclosure, if the PS call is not hung up by the network device within the third preset duration after the terminal device performs the PS call, the terminal device may further determine whether the target signaling sent by the network device is received within the third preset duration after performing the PS call. If the target signaling sent by the network device is received within the third preset duration after performing the PS call, step 608 is executed. If the target signaling sent by the network device is not received within the third preset duration after performing the PS call, step 609 is executed.

It should be noted that step 606 and step 607 are two parallel implementations, and one of them may be selected for execution in the practical application.

In step 608, the second call indication message is refused to respond to, so as to continue the PS call.

In some embodiments of the present disclosure, if the terminal device receives the target signaling sent by the network device within the third preset duration after performing the PS call, that is, if the terminal device receives the target signaling sent by the network device within the running period of the third timer, it indicates that the current PS call on the terminal device is performed to the ringing stage, and the terminal device may refuse to respond to the second call indication message (i.e., the CS call indication message), that is, refuse to send the ESR to the network device, such that the PS call is continued.

In step 609, the PS call is stopped and the second call indication message is responded to, so as to perform the CS call.

In some embodiments of the present disclosure, if the terminal device does not receive the target signaling sent by the network device within the third preset duration after performing the PS call, that is, if the terminal device does not receive the target signaling during the running period of the third timer, it indicates that the current PS call on the terminal device is not performed to the ringing stage, and the PS call may be stopped and the second call indication message (i.e., the CS call indication message) may be responded to, such that the CS call is performed.

It should be noted that step 608 and step 609 are two parallel implementations, and one of them may be selected for execution in the practical application.

In the call response method in some embodiments of the present disclosure, the first call indication message is responded to so as to perform the PS call if the first call indication message is a SIP_invite message when the target state is the connected state. It is determined whether the second call indication message is received within the third preset duration after performing the PS call. It is determined whether the PS call is hung up by the network device within the third preset duration if the second call indication message is received within the third preset duration. If the PS call is hung up by the network device, the second call indication message is responded to, so as to perform the CS call. If the PS call is not hung up by the network device, it is determined whether the target signaling sent by the network device is received within the third preset duration. The target signaling is configured to indicate that the PS call is performed to the ringing stage. If the target signaling is received within the third preset duration, the second call indication message is refused to respond to, so as to continue the PS call. If the target signaling is not received within the third preset duration, the PS call is stopped, and the second call indication message is responded to, so as to perform the CS call. In this way, the terminal device only performs one type of call at a moment, that is, the terminal device only performs the PS call or only performs the CS call at a moment, which may avoid a call failure caused by performing two different types of calls at the same time, and thus improve use experience.

In order to clearly illustrate any of the above-mentioned embodiments, the present disclosure further provides a call response method as follows.

Figure 7:
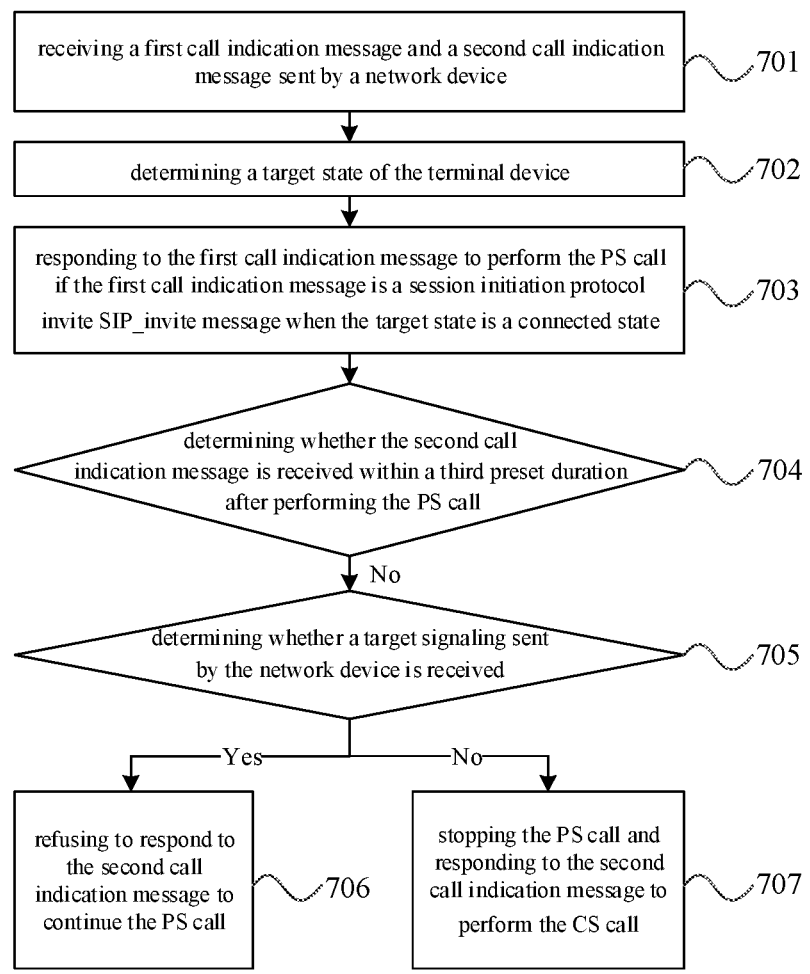
FIG. 7 is a schematic flow chart of a call response method in another embodiment of the present disclosure.

FIG. 7 is a flow chart of a call response method in another embodiment of the present disclosure.

As shown in FIG. 7, the call response method may include steps 701 to 707 as follows.

In step 701, a first call indication message and a second call indication message sent by a network device are received.

In step 702, a target state of the terminal device is determined.

In step 703, when the target state is a connected state, if the first call indication message is a SIP_invite message, the first call indication message is responded to, so as to perform a PS call.

In step 704, it is determined whether the second call indication message is received within a third preset duration after performing the PS call.

In some embodiments of the present disclosure, the terminal device may determine whether the second call indication message is received within the third preset duration after performing the PS call. That is, the terminal device may determine whether the second call indication message is received within a running period of a third timer. If the second call indication message is received within the third preset duration after performing the PS call, step 605 and its subsequent steps are executed. If the second call indication message is not received within the third preset duration after performing the PS call, step 705 and its subsequent steps are executed.

For execution processes of steps 701 to 704, reference may be made to the execution processes of similar steps in any of the above-mentioned embodiments of the present disclosure, which will not be repeated here.

In step 705, it is determined whether a target signaling sent by the network device is received if the second call indication message is received after the third preset duration.

In some embodiments of the present disclosure, the explanation of the target signaling in the above-mentioned step 607 is also applicable to the present embodiment, which is not repeated here.

In some embodiments of the present disclosure, if the terminal device receives the second call indication message after the third preset duration after performing the PS call, that is, if the terminal device receives the second call indication message after the third timer stops running, it may be determined whether the terminal device receives the target signaling sent by the network device. If the target signaling sent by the network device is received, step 706 is executed, and if the target signaling sent by the network device is not received, step 707 is executed.

In step 706, in response to receiving the target signaling, the second call indication message is refused to in respond to, so as to continue the PS call.

In some embodiments of the present disclosure, if the terminal device receives the target signaling, it indicates that the PS call is performed to a ringing stage, and thus the terminal device may refuse to respond to the second call indication message (i.e., the CS call indication message) to continue the PS call.

In step 707, in response to receiving no target signaling, the PS call is stopped, and the second call indication message is responded to, such that the CS call is performed.

In some embodiments of the present disclosure, if the terminal device does not receive the target signaling, it indicates that the PS call has not been performed to the ringing stage. At this time, the PS call may be stopped, and the second call indication message (i.e., the CS call indication message) may be responded to, such that the CS call may be performed.

It should be noted that, step 706 and step 707 are two parallel implementations, and one of them may be selected for execution in the practical application.

Figure 8:
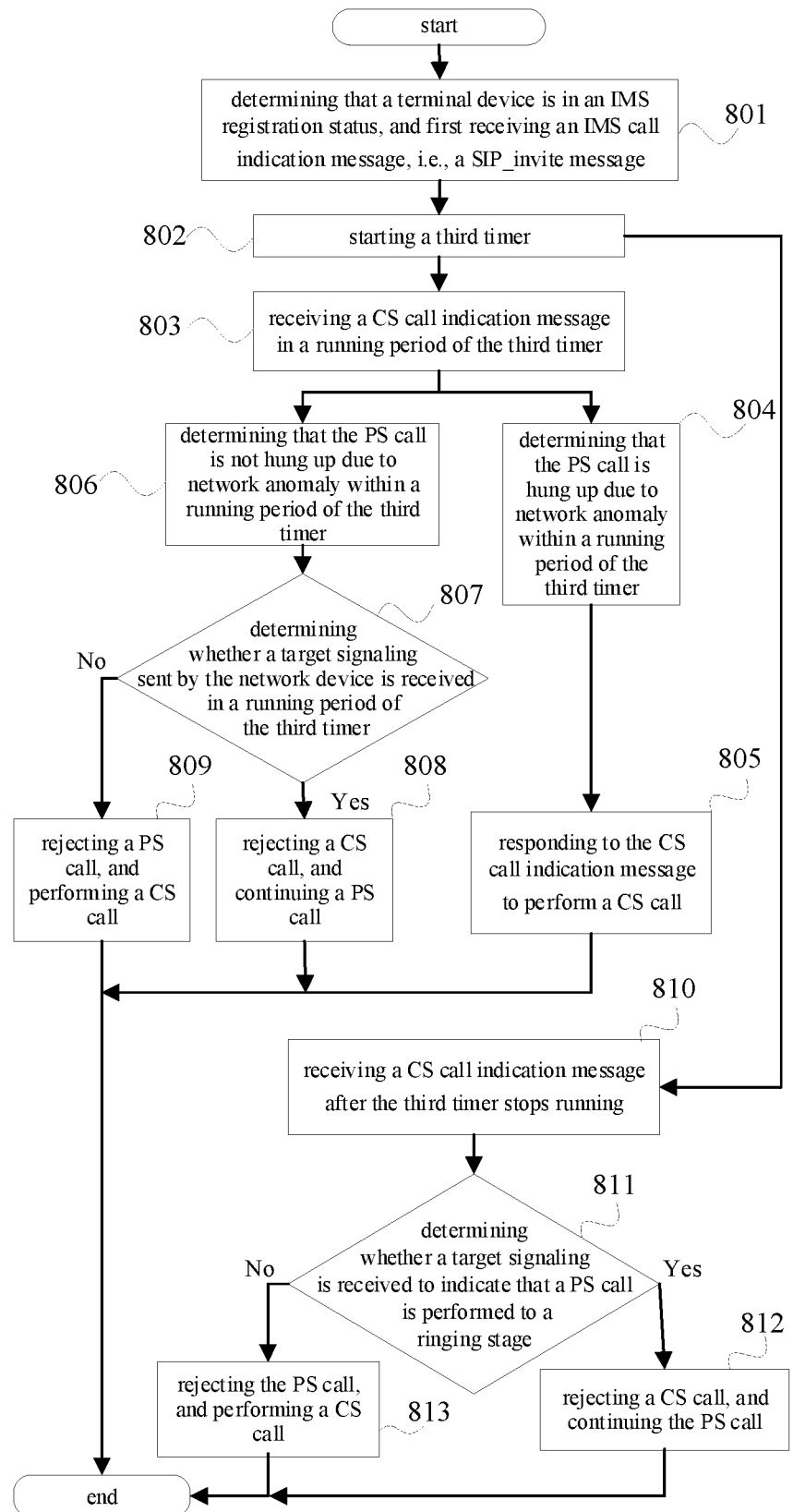
FIG. 8 is a schematic flow chart of a call response when a terminal device is in a connected state in an embodiment of the present disclosure.

In an application scenario, when a terminal device is in a connected state, a call response process of the terminal device may be as shown in FIG. 8, and may specifically include the following steps 801 to 813.

In step 801, when the terminal device is in a connected state, the terminal device is in an IMS registration state, that is, the terminal device is in a 4G/5G mode. If the terminal device is used as a voice called party, a first call indication message sent by a network device is a SIP_invite message received by the terminal device.

In step 802, after the SIP_invite message is received by the terminal device, the terminal device performs a PS call and starts a third timer. A running duration of the third timer is a third preset duration. When a value of the third timer is equal to the third preset duration, the third timer stops running.

It is determined whether the second call indication message (i.e., a CS call indication message) sent by the network device is received within the running period of the third timer. If the second call indication message sent by the network device is received within the running period of the third timer, steps 803 to 809 are executed, and if the second call indication message sent by the network device is not received within the running period of the third timer, steps 810 to 813 are executed.

In step 803, it is determined that the terminal device receives the second call indication message (i.e., the CS call indication message, specifically a CS service notification message) sent by the network device within the running period of the third timer.

If the terminal device receives the second call indication message sent by the network device within the running period of the third timer, it may be determined whether the PS call is hung up by the network device due to network anomaly within the running period of the third timer. If the PS call is hung up by the network device within the running period of the third timer, steps 804 to 805 are executed. If the PS call is not hung up by the network device within the running period of the third timer, steps 806 to 809 are executed.

In step 804, it is determined that the PS call is hung up by the network device within the running period of the third timer.

In step 805, if the PS call is hung up by the network device within the running period of the third timer, the terminal device may respond to the second call indication message to perform the CS call, that is, the terminal device may send an ESR to the network device to perform a CSFB.

In step 806, it is determined that the PS call is not hung up by the network device within the running period of the third timer.

In step 807, if the PS call is not hung up by the network device within the running period of the third timer, it may be determined whether the terminal device receives a target signaling sent by the network device, and the target signaling is configured to indicate that the PS call is performed to a ringing stage, such as a 180 ringing stage.

In step 808, if the terminal device receives the target signaling within the running period of the third timer, it indicates that the PS call is performed to the ringing stage. At this time, the CS call may be rejected and the PS call may be continued to wait for a follow-up instruction from the network device.

In step 809, if the target signaling is not received within the running period of the third timer, it indicates that the PS call is not performed to the ringing stage and the IMS network is anomalous. At this time, the terminal device may stop the ongoing PS call and accept the CS call to perform the CSFB.

In step 810, it is determined that the second call indication message (that is, the CS call indication message) is received after the third timer stops running.

In step 811, if the second call indication message (that is, the CS call indication message) is received after the third timer stops running, it may be determined whether the terminal device receives the target signaling sent by the network device. The target signaling is configured to indicate that the PS call is performed to the ringing stage.

In step 812, if the terminal device receives the target signaling sent by the network device after the third timer stops running, it indicates that the PS call is performed to the ringing stage. At this time, the CS call may be rejected and the PS call may be continued to wait for a follow-up instruction from the network device.

In step 813, if the terminal device does not receive the target signaling sent by the network device after the third timer stops running, it indicates that the PS call is not performed to the ringing stage, and the IMS network is anomalous. At this time, the ongoing PS call may be stopped, and the second call indication message is responded to, such that the CS call is performed.

In this way, when the terminal device is in the 4G/5G network mode and is in the connected state, if the terminal device is used as the called party, by using the above-mentioned method, it is possible to effectively avoid a call failure caused by performing the CS call and the PS call at the same time in case that the terminal device continues to receive the CS call indication message sent by the network device due to the network anomaly to perform the CS call after receiving the SIP_invite message to perform the PS call.

In the call response method in some embodiments of the present disclosure, if the second call indication message is received after the third preset duration, it is determined whether the target signaling sent by the network device is received. In response to receiving the target signaling, the second call indication message is refused to respond to, and the PS call is continued performing. In response to receiving no target signaling, the PS call is stopped, and the second call indication message is responded to, so as to perform the CS call. In this way, the terminal device only performs one type of call at a moment, that is, the terminal device only performs the PS call or only performs the CS call at a moment, which may avoid a call failure caused by performing two different types of calls at the same time, and thus improve use experience.

The present disclosure further provides a call response device corresponding to the call response methods in the above-mentioned embodiments in FIG. 2 to FIG. 7. Since the call response devices in some embodiments of the present disclosure correspond to the call response methods in the above-mentioned embodiments of FIG. 2 to FIG. 7, the implementation of the call response method is also applicable to the call response device in some embodiments of the present disclosure, which will not be described in detail here.

Figure 9:
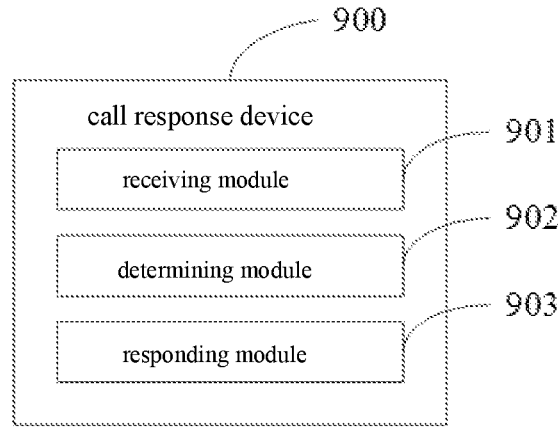
FIG. 9 is a schematic diagram illustrating a call response device in an embodiment of the present disclosure.

FIG. 9 is a schematic diagram illustrating a call response device in an embodiment of the present disclosure.

As shown in FIG. 9, the call response device 900 may include a receiving module 901, a determining module 902 and a responding module 903.

The receiving module 901 is configured to receive a first call indication message and a second call indication message sent by a network device. The first call indication message is received earlier than the second call indication message, and is configured to indicate that one of a packet switching domain PS call and a circuit switching domain CS call is to be performed by the terminal device. The second call indication message is configured to indicate that the other of the PS call and the CS call is to be performed by the terminal device.

The determining module 902 is configured to determine a target state of the terminal device.

The responding module 903 is configured to respond to the first call indication message or the second call indication message according to the target state to perform the PS call or the CS call.

In some embodiments of the present disclosure, the responding module 903 is configured to determine whether the first call indication message is a PS paging message when the target state is an idle state, establish a first communication connection with the network device in response to the first call indication message being the PS paging message, determine whether a third call indication message sent by the network device is received within a first preset duration after the second call indication message is received if the second call indication message is received after establishing of the first communication connection is completed, respond to the first call indication message to perform the PS call and refuse to respond to the second call indication message to reject the CS call in response to receiving the third call indication message within the first preset duration. The third call indication message is configured to indicate that the PS call is to be performed by the terminal device based on the first communication connection.

In some embodiments of the present disclosure, the responding module 903 is configured to refuse to respond to the first call indication message to reject the PS call in response to receiving no third call indication message within the first preset duration, and respond to the second call indication message to perform the CS call.

In some embodiments of the present disclosure, the responding module 903 is configured to establish a second communication connection with the network device in response to the first call indication message being a CS paging message, determine whether the second call indication message is received within a second preset duration after establishing of the second communication connection is completed, and respond to the second call indication message to perform the PS call and refuse to respond to the first call indication message to reject the CS call if the second call indication message is received within the second preset duration.

In some embodiments of the present disclosure, the responding module 903 is configured to respond to the first call indication message to perform the CS call and refuse to respond to the second call indication message to reject the PS call if the second call indication message is received beyond the second preset duration.

In some embodiments of the present disclosure, the responding module 903 is configured to respond to the first call indication message to perform the PS call if the first call indication message is a session initiation protocol invite SIP_invite message when the target state is a connected state; determine whether the second call indication message is received within a third preset duration after performing the PS call, determine whether the PS call is hung up by the network device within the third preset duration if the second call indication message is received within the third preset duration, and respond to the second call indication message to perform the CS call if the PS call is hung up by the network device.

In some embodiments of the present disclosure, the responding module 903 is configured to acquire network information of the network device within the third preset duration, determine whether the network device is anomalous according to the network information, determine that the PS call is hung up by the network device in case that the network device is anomalous, and determine that the PS call is not hung up by the network device in case that the network device is not anomalous.

In some embodiments of the present disclosure, the responding module 903 is configured to determine whether a target signaling sent by the network device is received within the third preset duration if the PS call is not hung up by the network device, refuse to respond to the second call indication message to continue the PS call if the target signaling is received within the third preset duration, and stop the PS call and responding to the second call indication message to perform the CS call if the target signaling is not received within the third preset duration. The target signaling is configured to indicate that the PS call is performed to a ringing stage.

In some embodiments of the present disclosure, the responding module 903 is configured to determine whether a target signaling sent by the network device is received if the second call indication message is received after the third preset duration, refuse to respond to the second call indication message to continue the PS call in response to receiving the target signaling, and stop the PS call and responding to the second call indication message to perform the CS call in response to receiving no target signaling.

In the call response device of the present disclosure, the first call indication message and the second call indication message sent by the network device are received. The first call indication message is received earlier than the second call indication message, and is configured to indicate that one of a packet switching domain PS call and a circuit switching domain CS call is to be performed by the terminal device. The second call indication message is configured to indicate that the other of the PS call and the CS call is to be performed by the terminal device. The target state of the terminal device is determined. The first call indication message or the second call indication message is responded to according to the target state to perform the PS call or the CS call. In this way, one of the first call indication message and the second call indication message successively sent by the network device is responded to according to the target state of the terminal device, such that the terminal device only performs one type of call at a moment, that is, only performs the PS call or only performs the CS call, which may avoid a call failure in a related art caused by performing the PS call and the CS call by the terminal device at the same time when the network device sends two different types of call indication messages at the same time due to a network anomaly, thus avoiding a situation that the user misses an incoming call. Thus, it is possible to effectively improve the user experience.

In order to realize the above-mentioned embodiments, the present disclosure also provides a terminal device. The terminal device includes a processor, and a memory for storing instructions executable by the processor. The processor is configured to execute the executable instructions stored in the memory to perform the call response method according to any one of the above-mentioned embodiments of the present disclosure.

In order to realize the above-mentioned embodiments, the present disclosure also provides a non-transitory computer-readable storage medium. The non-transitory computer-readable storage medium has stored therein a computer program that, when executed by a processor, causes the processor to perform the call response method according to any one of the above-mentioned embodiments of the present disclosure.

In order to realize the above-mentioned embodiments, the present disclosure also provides a computer program product. When an instruction in the computer program product is executed by a processor, the processor is configured to perform the call response method according to any one of the above-mentioned embodiments of the present disclosure.

Figure 10:
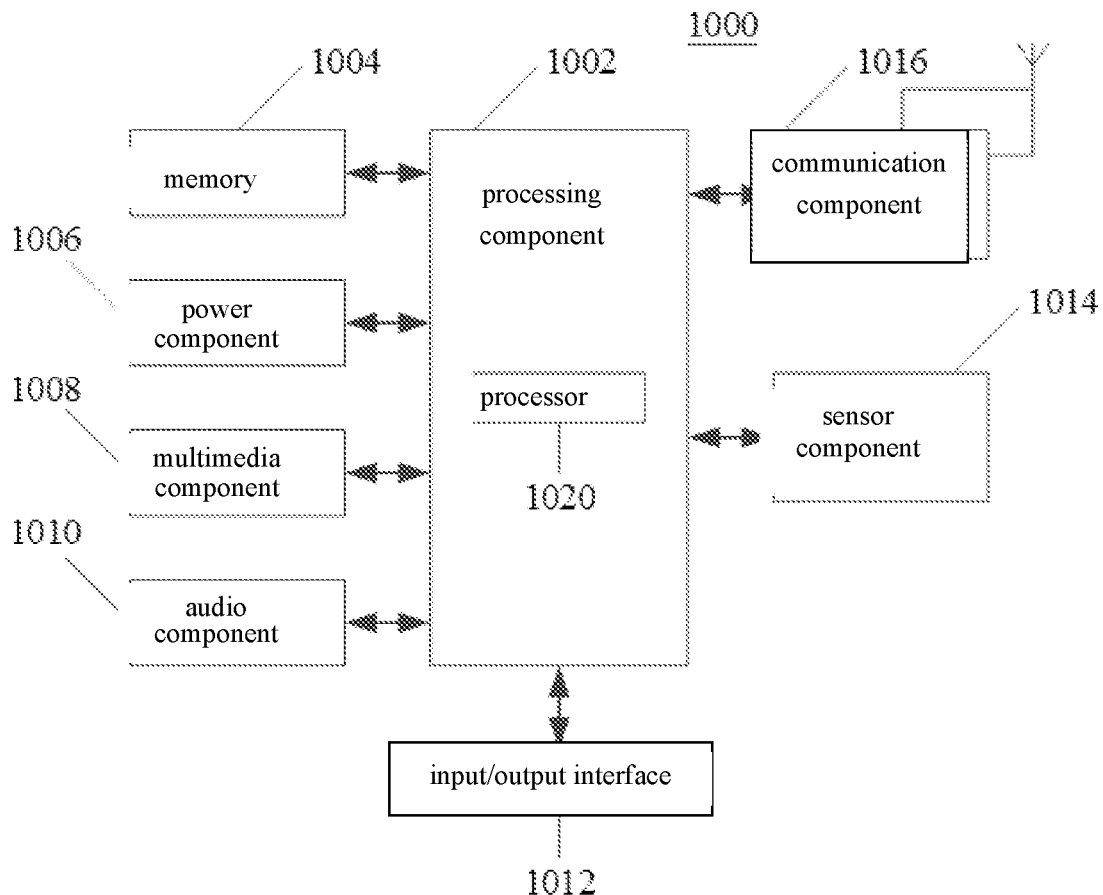
FIG. 10 is a block diagram illustrating a terminal device in an embodiment of the present disclosure.

FIG. 10 is a block diagram illustrating a terminal device in an embodiment of the present disclosure. For example, the terminal device 1000 may be a mobile phone, a computer, a digital broadcasting terminal, a messaging device, a game console, a tablet device, a medical device, a fitness device, a personal digital assistant, etc.

Referring to FIG. 10, the terminal device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 generally controls the overall operations of the terminal device 1000, such as operations associated with display, telephone calls, data communications, camera operations, and recording operations. The processing component 1002 may include one or more processors 1020 to execute instructions to complete all or some of the steps of the above method. In addition, the processing component 1002 may include one or more modules to facilitate the interaction between the processing component 1002 and other components. For example, the processing component 1002 may include a multimedia module to facilitate the interaction between the multimedia component 1008 and the processing component 1002.

The memory 1004 is configured to store various types of data to support the operation of the terminal device 1000. Examples of these data include instructions for any application or method operating on the terminal device 1000, e.g., contact data, phonebook data, messages, pictures, videos, etc. The memory 1004 may be implemented by any type of volatile or non-volatile storage devices or combinations thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1006 provides power to various components of the terminal device 1000. The power components 1006 may include a power management system, one or more power sources, and other components associated with generation, management, and distribution of power to the terminal device 1000.

The multimedia component 1008 includes a screen that provides an output interface between the terminal device 1000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slidings, and gestures on the touch panel. The touch sensor may not only sense the boundary of a touch or slide action, but also detect the duration and pressure related to the touch or sliding. In some embodiments, the multimedia component 1008 includes a front camera and/or a rear camera. When the terminal device 1000 is in an operation mode, such as a shooting mode or a video mode, the front camera and/or the rear camera can receive external multimedia data. Each of the front camera and the rear camera can be a fixed optical lens system or have focal length and optical zoom capabilities.

The audio component 1010 is configured to output and/or input audio signals. For example, the audio component 1010 includes a microphone (MIC). When the terminal device 1000 is in an operation mode, such as a call mode, a recording mode, and a voice recognition mode, the microphone is configured to receive an external audio signal. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and a peripheral interface module. The peripheral interface module may be a keyboard, a click wheel, buttons, etc. These buttons may include, but are not limited to, a home button, a volume button, a start button, and a lock button.

The sensor component 1014 includes one or more sensors for providing the terminal device 1000 with status assessment in various aspects. For example, the sensor component 1014 may detect the on/off status of the terminal device 1000 and the relative positioning of components, for example, the display and the keypad, of the terminal device 1000. The sensor component 1014 can also detect the position change of the terminal device 1000 or a component of the terminal device 1000, the presence or absence of contact between the user and the terminal device 1000, the orientation or acceleration/deceleration of the terminal device 1000, and the temperature change of the terminal device 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the terminal device 1000 and other devices. The terminal device 1000 can access a wireless network based on a communication standard, such as WiFi, 4G, or 5G, or a combination thereof. In an exemplary embodiment, the communication component 1016 receives a broadcast signal or broadcast related information from an external broadcast management system via a broadcast channel. In an exemplary embodiment, the communication component 1016 further includes a near field communication (NFC) module to facilitate short-range communication. For example, the NFC module can be implemented based on a radio frequency identification (RFID) technology, an infrared data association (IrDA) technology, an ultra-wideband (UWB) technology, a bluetooth (BT) technology and other technologies.

In an exemplary embodiment, the terminal device 1000 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiment, there is also provided a non-transitory computer-readable storage medium having stored therein instructions, such as a memory 1004 including instructions, which may be executed by the processor 1020 of the terminal device 1000 to perform the above methods. For example, the non-transitory computer-readable storage medium may be a ROM, a random access memory (RAM), a CD-ROM, a magnetic tape, a floppy disk, an optical data storage device, etc.

In the description of this specification, the reference term "an embodiment," "some embodiments," "an example," "a specific example," or "some examples," means that a particular feature, structure, material, or characteristic described in connection with the embodiment or example is included in at least one embodiment or example of the present disclosure. In this specification, the above-mentioned term in various places throughout this specification are not necessarily referring to the same embodiment or example of the present disclosure. Furthermore, the particular features, structures, materials, or characteristics may be combined in any suitable manner in one or more embodiments or examples. In addition, those skilled in the art can combine the different embodiments or examples and the features described in this specification without being mutually inconsistent.

In addition, terms such as "first" and "second" are used for purposes of description and are not intended to indicate or imply relative importance or to imply the number of indicated technical features. Thus, the feature defined with "first" and "second" may include at least one of this feature. In the description of the present disclosure, "a plurality of" means two or more, for example, two or three, unless specified otherwise.

Any process or method described in a flow chart or described herein in other ways may be understood to include one or more modules, segments or portions of codes of executable instructions for achieving specific logical functions or steps in the process. In addition, the scope of a preferred embodiment of the present disclosure includes other implementations, in which the functions may be performed out of the order shown or discussed, including substantially concurrently or in the reverse order depending on the functions involved, which should be understood by those skilled in the art.

The logic and/or step shown in the flow chart or described herein in other manners, for example, a particular sequence table of executable instructions for realizing the logical function, may be specifically achieved in any computer readable medium to be used by an instruction execution system, device or equipment (such as a system based on computers, a system including processors or other systems capable of obtaining an instruction from the instruction execution system, device and equipment and executing the instruction), or to be used in combination with the instruction execution system, device and equipment. As to the specification, "the computer readable medium" may be any device capable of including, storing, communicating, propagating or transferring programs to be used by or in combination with the instruction execution system, device or equipment. More specific examples of the computer readable medium include, but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon. This is because, for example, the paper or other appropriate medium may be optically scanned and then edited, decrypted or processed with other appropriate methods when it is needed to obtain the programs in an electric manner, and then the programs may be stored in a computer memory.

It should be understood that each part of the present disclosure may be realized by a hardware, software, firmware or their combination. In the above embodiments, a plurality of steps or methods may be realized by the software or firmware stored in the memory and executed by the appropriate instruction execution system. For example, if they are realized by the hardware, likewise in another embodiment, the steps or methods may be realized by any one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or some of the steps in the above exemplary method of the present disclosure may be achieved by commanding the related hardware with programs. The programs may be stored in a computer readable storage medium, and the programs include one or a combination of the steps in the method embodiments of the present disclosure when running on a computer.

In addition, each functional cell of the embodiments of the present disclosure may be integrated in a processing module, or these cells may be separate physical existence, or two or more cells are integrated in a processing module. The integrated module may be realized in a form of hardware or in a form of software functional modules. When the integrated module is realized in a form of software functional module and is sold or used as a standalone product, the integrated module may be stored in a computer readable storage medium.

The storage medium mentioned above may be read-only memories, magnetic disks, compact disks, etc. Although explanatory embodiments have been shown and described above, it would be appreciated by those skilled in the art that the above embodiments cannot be construed to limit the present disclosure, and changes, variations, alternatives, and modifications can be made in the embodiments without departing from the scope of the present disclosure.

What is claimed is:

1. A call response method applied to a terminal device, comprising:
    receiving a first call indication message and a second call indication message sent by a network device, wherein the first call indication message is received earlier than the second call indication message and is configured to indicate that one of a packet switching domain (PS) call and a circuit switching domain (CS) call is to be performed by the terminal device, and the second call indication message is configured to indicate that the other of the PS call and the CS call is to be performed by the terminal device;
    determining a target state of the terminal device; and
    responding to the first call indication message or the second call indication message according to the target state to perform the PS call or the CS call;
    wherein responding to the first call indication message or the second call indication message according to the target state to perform the PS call or the CS call comprises:
    determining whether the first call indication message is a PS paging message when the target state is an idle state;
    establishing a first communication connection with the network device in response to the first call indication message being the PS paging message;
    determining whether a third call indication message sent by the network device is received within a first preset duration after the second call indication message is received in response to determining that the second call indication message is received after establishing of the first communication connection is completed, wherein the third call indication message is configured to indicate that the PS call is to be performed by the terminal device based on the first communication connection; and
    responding to the first call indication message to perform the PS call and refusing to respond to the second call indication message to reject the CS call in response to receiving the third call indication message within the first preset duration.

2. The method according to claim 1, after determining whether the third call indication message sent by the network device is received within the first preset duration after the second call indication message is received, further comprising:
    refusing to respond to the first call indication message to reject the PS call in response to receiving no third call indication message within the first preset duration; and
    responding to the second call indication message to perform the CS call.

3. The method according to claim 1, further comprising:
establishing a second communication connection with the network device in response to the first call indication message being a CS paging message;
determining whether the second call indication message is received within a second preset duration after establishing of the second communication connection is completed; and
responding to the second call indication message to perform the PS call and refusing to respond to the first call indication message to reject the CS call in response to determining that the second call indication message is received within the second preset duration.

4. The method according to claim 3, further comprising:
responding to the first call indication message to perform the CS call and refusing to respond to the second call indication message to reject the PS call in response to determining that the second call indication message is received beyond the second preset duration.

5. The method according to claim 1, wherein responding to the first call indication message or the second call indication message according to the target state to perform the PS call or the CS call comprises:
responding to the first call indication message to perform the PS call in response to determining that the first call indication message is a session initiation protocol invite SIP_invite message when the target state is a connected state;
determining whether the second call indication message is received within a third preset duration after performing the PS call;
determining whether the PS call is hung up by the network device within the third preset duration in response to determining that the second call indication message is received within the third preset duration; and
responding to the second call indication message to perform the CS call in response to determining that the PS call is hung up by the network device.

6. The method according to claim 5, wherein determining whether the PS call is hung up by the network device within the third preset duration comprises:
acquiring network information of the network device within the third preset duration;
determining whether the network device is anomalous according to the network information;
determining that the PS call is hung up by the network device in case that the network device is anomalous; and
determining that the PS call is not hung up by the network device in case that the network device is not anomalous.

7. The method according to claim 5, further comprising:
determining whether a target signaling sent by the network device is received within the third preset duration in response to determining that the PS call is not hung up by the network device, wherein the target signaling is configured to indicate that the PS call is performed to a ringing stage;
refusing to respond to the second call indication message to continue the PS call in response to determining that the target signaling is received within the third preset duration; and
stopping the PS call and responding to the second call indication message to perform the CS call in response to determining that the target signaling is not received within the third preset duration.

8. The method according to claim 5, further comprising:
determining whether a target signaling sent by the network device is received in response to determining that the second call indication message is received after the third preset duration;
refusing to respond to the second call indication message to continue the PS call in response to receiving the target signaling; and
stopping the PS call and responding to the second call indication message to perform the CS call in response to receiving no target signaling.

9. A terminal device, comprising:
at least one processor;
a memory for storing instructions executable by the at least one processor;
wherein the at least one processor is configured to invoke and execute the executable instructions stored in the memory to:
receive a first call indication message and a second call indication message sent by a network device, wherein the first call indication message is received earlier than the second call indication message and is configured to indicate that one of a packet switching domain (PS) call and a circuit switching domain (CS) call is to be performed by the terminal device, and the second call indication message is configured to indicate that the other of the PS call and the CS call is to be performed by the terminal device;
determine a target state of the terminal device; and
respond to the first call indication message or the second call indication message according to the target state to perform the PS call or the CS call;
wherein when responds to the first call indication message or the second call indication message according to the target state to perform the PS call or the CS call, the at least one processor is configured to:
determine whether the first call indication message is a PS paging message when the target state is an idle state;
establish a first communication connection with the network device in response to the first call indication message being the PS paging message;
determine whether a third call indication message sent by the network device is received within a first preset duration after the second call indication message is received in response to determining that the second call indication message is received after establishing of the first communication connection is completed, wherein the third call indication message is configured to indicate that the PS call is to be performed by the terminal device based on the first communication connection; and
respond to the first call indication message to perform the PS call and refuse to respond to the second call indication message to reject the CS call in response to receiving the third call indication message within the first preset duration.

10. The terminal device according to claim 9, wherein the at least one processor is further configured to execute the instructions to:
refuse to respond to the first call indication message to reject the PS call in response to receiving no third call indication message within the first preset duration; and
respond to the second call indication message to perform the CS call.

11. The terminal device according to claim 9, wherein the at least one processor is further configured to execute the instructions to:

establish a second communication connection with the network device in response to the first call indication message being a CS paging message;

determine whether the second call indication message is received within a second preset duration after establishing of the second communication connection is completed; and respond to the second call indication message to perform the PS call and refuse to respond to the first call indication message to reject the CS call in response to determining that the second call indication message is received within the second preset duration.

12. The terminal device according to claim 11, wherein the at least one processor is further configured to execute the instructions to:

respond to the first call indication message to perform the CS call and refuse to respond to the second call indication message to reject the PS call in response to determining that the second call indication message is received beyond the second preset duration.

13. The terminal device according to claim 9, wherein the at least one processor is further configured to execute the instructions to:

respond to the first call indication message to perform the PS call in response to determining that the first call indication message is a session initiation protocol invite SIP_invite message when the target state is a connected state;

determine whether the second call indication message is received within a third preset duration after performing the PS call;

determine whether the PS call is hung up by the network device within the third preset duration in response to determining that the second call indication message is received within the third preset duration; and respond to the second call indication message to perform the CS call in response to determining that the PS call is hung up by the network device.

14. The terminal device according to claim 13, wherein the at least one processor is further configured to execute the instructions to:

acquire network information of the network device within the third preset duration;

determine whether the network device is anomalous according to the network information;

determine that the PS call is hung up by the network device in case that the network device is anomalous; and determine that the PS call is not hung up by the network device in case that the network device is not anomalous.

15. The terminal device according to claim 13, wherein the at least one processor is further configured to execute the instructions to:

determine whether a target signaling sent by the network device is received within the third preset duration in response to determining that the PS call is not hung up by the network device, wherein the target signaling is configured to indicate that the PS call is performed to a ringing stage;

refuse to respond to the second call indication message to continue the PS call in response to determining that the target signaling is received within the third preset duration; and stop the PS call and respond to the second call indication message to perform the CS call in response to determining that the target signaling is not received within the third preset duration.

16. The terminal device according to claim 13, wherein the at least one processor is further configured to execute the instructions to:

determine whether a target signaling sent by the network device is received in response to determining that the second call indication message is received after the third preset duration;

refuse to respond to the second call indication message to continue the PS call in response to receiving the target signaling; and stop the PS call and respond to the second call indication message to perform the CS call in response to receiving no target signaling.

17. A non-transitory computer-readable storage medium having stored therein a computer program that, when executed by at least one processor, causes the at least one processor to:

receive a first call indication message and a second call indication message sent by a network device, wherein the first call indication message is received earlier than the second call indication message and is configured to indicate that one of a packet switching domain PS call and a circuit switching domain CS call is to be performed by the terminal device, and the second call indication message is configured to indicate that the other of the PS call and the CS call is to be performed by the terminal device;

determine a target state of the terminal device; and respond to the first call indication message or the second call indication message according to the target state to perform the PS call or the CS call;

wherein when responds to the first call indication message or the second call indication message according to the target state to perform the PS call or the CS call, the at least one processor is configured to:

determine whether the first call indication message is a PS paging message when the target state is an idle state;

establish a first communication connection with the network device in response to the first call indication message being the PS paging message;

determine whether a third call indication message sent by the network device is received within a first preset duration after the second call indication message is received in response to determining that the second call indication message is received after establishing of the first communication connection is completed, wherein the third call indication message is configured to indicate that the PS call is to be performed by the terminal device based on the first communication connection; and respond to the first call indication message to perform the PS call and refuse to respond to the second call indication message to reject the CS call in response to receiving the third call indication message within the first preset duration.

* * * * *